United States Patent
Houssat et al.

(10) Patent No.: US 12,109,982 B2
(45) Date of Patent: Oct. 8, 2024

(54) ADAPTER FOR A WIPER BLADE OF A VEHICLE

(71) Applicant: Valeo Systemes d'Essuyage, Le Mesnil Saint Denis (FR)

(72) Inventors: Stéphane Houssat, Le Mesnil Saint Denis (FR); Vincent Gaucher, Le Mesnil Saint Denis (FR); Eric Poton, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 17/815,651

(22) Filed: Jul. 28, 2022

(65) Prior Publication Data
US 2023/0032508 A1     Feb. 2, 2023

(30) Foreign Application Priority Data
Jul. 30, 2021 (FR) ....................................... 2108307

(51) Int. Cl.
*B60S 1/40* (2006.01)

(52) U.S. Cl.
CPC ........... *B60S 1/4074* (2013.01); *B60S 1/4067* (2013.01); *B60S 1/4077* (2013.01)

(58) Field of Classification Search
CPC ...... B60S 1/4003; B60S 1/4067; B60S 1/407; B60S 1/4074; B60S 1/4045; B60S 1/4048; B60S 2001/4025
USPC .................................................... 15/250.32
See application file for complete search history.

(56) References Cited

U.S. PATENT DOCUMENTS

2013/0185890 A1 *   7/2013   Ku ....................... B60S 1/4077
                                                          15/250.32

FOREIGN PATENT DOCUMENTS

| DE | 2629549 | * | 1/1978 |
| EP | 0285262 | * | 10/1988 |
| EP | 3168092 A1 | | 5/2017 |
| FR | 2507137 | * | 12/1982 |
| FR | 2584036 | * | 1/1987 |
| WO | 2020/135959 A1 | | 7/2020 |
| WO | 2022/058348 A1 | | 3/2022 |

OTHER PUBLICATIONS

Machine translation of description portion of French publication 2584036, published Jan. 1987. (Year: 1987).*

(Continued)

*Primary Examiner* — Gary K. Graham
(74) *Attorney, Agent, or Firm* — Osha Bergman Watanabe & Burton LLP (57) ABSTRACT

The invention relates to an adapter (25) intended to connect a wiper blade to a driving arm for a vehicle via a connector (24), having a first lateral wall (251) and a second lateral wall (252) between which an upper wall (250) is positioned, at least one of these lateral walls (251) comprising a pivot member intended to allow the adapter (25) to rotate with respect to the connector (24), the pivot member comprising at least one hole (451) configured to receive a shaft of the driving arm. According to the invention, this hole (451) has at least one rib able to block pivoting between the shaft of the driving arm and the adapter (25).

12 Claims, 4 Drawing Sheets

(56) References Cited

OTHER PUBLICATIONS

Machine translation of description portion of WO publication 2022/058348, published Mar. 2022. (Year: 2022).*
Preliminary Search Report and Written Opinion issued in corresponding French Application No. 2108307, dated Apr. 21, 2022 (8 pages).

* cited by examiner

ADAPTER FOR A WIPER BLADE OF A VEHICLE

The present invention relates to the field of vehicle wipers and more particularly connecting devices allowing a wiper blade to be connected to a driving arm.

Wiper systems for vehicles are designed to remove liquids and dirt, which can disrupt the driver's view of his surroundings, by wiping. These wiper systems generally comprise a driving arm that carries out an angular back-and-forth movement, and elongate wipers which themselves carry blade rubbers made of a resilient material. The blade rubber rubs against the windscreen and removes this liquid and dirt by sweeping it out of the driver's field of view.

The wiper blade is attached to the driving arm by a connection system which comprises a connector and an adapter. The connector is a component that is secured to the wiper blade, and which is generally secured to the wiper blade rubber. The adapter is a component that is interposed between the driving arm and the connector, being configured to fit into an endpiece belonging to the driving arm. The connector and adapter then collaborate to provide an articulated connection and to attach the wiper blade to the driving arm thus forming the device that connects the wiper blade to the driving arm.

The articulated connection between the connector and the adapter comprises at least one transverse axis of pivoting of the connector with respect to the adapter, which is also an axis of pivoting of the wiper blade with respect to the driving arm. One of the members, for example the connector, generally comprises a substantially cylindrical shape which forms a pivot and which is received in a housing of complementary shape in the other member, in this instance the adapter.

The adapter is connected to the driving arm via a shaft of this driving arm which passes right through the adapter, passing through openings positioned on lateral walls of this adapter. During use of the wiping system, it is possible for there to be pivoting or slippage between the adapter and the driving arm.

Such pivoting or slippage disrupts the movement of the wiper blade and thus impairs the quality of the sweep across the windscreen of the vehicle.

There is therefore an aim to avoid such pivoting or slippage between the adapter and the driving arm. In order to do this, one of the solutions is to generate a situation whereby the shaft of the driving arm and its receiving opening in the adapter are braced relative to one another.

The present invention falls within this context and proposes an adapter able to bring about a bracing relative to one another between the shaft of the driving arm and a pivot member positioned on a lateral wall of the adapter, the shaft of the driving arm for this purpose being wedged within this pivot member.

One subject-matter of the present invention thus relates to an adapter intended to connect a wiper blade to a driving arm for a vehicle via a connector, having a first lateral wall and a second lateral wall between which an upper wall is positioned, at least one of these lateral walls comprising a pivot member intended to allow the adapter to rotate with respect to the connector, the pivot member comprising at least one hole configured to receive a shaft of the driving arm. According to the invention, this pivot member comprises at least one immobilizing member able to block pivoting between the shaft of the driving arm and the adapter within the hole.

The immobilizing member is, for example, at least one rib which projects into the hole, or a series of blocks or sectors which likewise project into the hole.

The adapter therefore contributes to connecting the wiper blade to the driving arm, via the connector which is secured to the wiper blade. The adapter is assembled on this connector by a fitting-together and the connection device thus formed can accept the driving arm, this connection device here comprising at least one hole configured to accept a shaft of this driving arm.

The pivot member may notably comprise a pivot bushing. The hole, which is positioned on one of the lateral walls of the adapter, advantageously at the centre of the pivot bushing, forms a receiving cylinder formed in the thickness of this lateral wall, this receiving cylinder advantageously being of circular cross section. The hole has at least one rib able to block pivoting between the shaft of the driving arm and the adapter, this rib allowing the shaft of the driving arm to be wedged within the pivot member and, more particularly, within the hole.

According to one feature of the invention, the immobilizing member comprises at least one rib formed on a surface delimiting the hole.

According to another feature of the invention, the immobilizing member comprises at least three ribs separated from one another by an angular sector of 120°. When the immobilizing member has three ribs, these may be equally distributed over a surface delimiting the hole and then separated by angular sectors of 120°. The number of ribs may be a multiple of three; it is possible for example to envisage an adapter according to the invention comprising six ribs, or even twelve ribs, arranged uniformly within the hole. What is meant by "within the hole" is that the ribs, however many of them thereof, are formed on the surface that delimits the hole, extending into the thickness of the lateral wall that bears the hole.

According to another feature of the invention, the at least one rib extends parallel to an axis of the hole configured to accept the shaft of the driving arm. The ribs therefore extend in a direction in which the shaft of the driving arm also extends. This direction is perpendicular to a longitudinal direction or direction of elongation of the adapter. Alternatively, the ribs may extend transversely to the axis of the hole, or in a spiral wrapped around the axis of the hole.

According to one feature, the lateral wall bearing the hole is delimited by an internal face and an external face, and at least one of the ribs extends continuously from the internal face to the external face of the lateral wall. The at least one rib thus extends over the entire thickness of the lateral wall, which is delimited at a first end by the internal face and at a second end by the external face.

According to one feature, the immobilizing member, notably at least one rib, projects from a surface delimiting the hole. The immobilizing member thus extends into the hole and from the surface delimiting this hole. It will be appreciated that this surface delimiting the hole corresponds to the thickness of the lateral wall as described hereinabove. The at least one rib projects from this wall, which is to say extends out from this wall and beyond same in the direction of a centre of the hole. The rib may for example project by 0.05 cm from the wall delimiting the hole.

According to one feature of the invention, the first lateral wall is provided with the hole configured to accept the shaft of the driving arm, the second lateral wall comprising an orifice aligned on an axis of the hole and which has a cross section of parallelepipedal shape. The adapter thus comprises two openings, aligned along the one same axis for the receiving of the driving arm: a hole, positioned on the first lateral wall, and an orifice, positioned on the second lateral wall. The hole is of substantially circular shape, whereas the orifice has a parallelepipedal cross section. Because the driving arm passes right through the adapter, it passes both through the hole and through the orifice.

The invention also relates to a connection device for a vehicle, intended for connecting a wiper blade to a driving arm, comprising at least a connector configured to be secured to the wiper blade and at least an adapter as described hereinabove.

According to one feature, the connector comprises a bearing that accepts the pivot member. This bearing contributes to the pivoting function, the pivot bushing of the adapter being configured to fit into the bearing of the connector in an assembly of the male-female type.

According to another feature of the invention, the connector comprises a ring which projects from a lateral face of the connector, the ring being housed in the orifice of the second lateral wall of the adapter. In the same way as the pivot bushing and the bearing, this ring is intended to fit into the orifice of the second lateral wall of the adapter in a male-female assembly, so as to contribute to performing the function whereby the adapter and the connector pivot relative to one another.

It will thus be appreciated that the invention prevents any rotation between the hole and the shaft of the driving arm, the pivoting required for correct operation of the sweeping action being performed by the pivot member which allows the adapter to pivot relative to the connector.

The invention further relates to a wiper comprising an adapter or a connection device as described above. Regarding the wiper blade comprising an adapter as described, the invention may envisage a package bearing, or which is to receive, a wiper blade and such an adapter, whether or not this adapter is assembled with the wiper blade.

The invention further relates to a wiping system comprising a driving arm bearing a wiper blade as described hereinabove, the wiper blade being connected to the driving arm by means of the connection device, the adapter being immobilized in terms of rotational and in terms of translational movement with respect to the driving arm by the immobilization member, the adapter being mounted with the ability to pivot with respect to the connector via at least the pivot member. What is meant by "immobilized in terms of rotational and in terms of translational movement" is that the wiper blade remains immobile relative to the driving arm, which is to say that the rotation about an axis of the shaft of the driving arm and translational movement along this axis are prevented as long as a force lower than 30 Nm is applied translationally between the wiper blade and the driving arm. This then avoids any slippage during operation between the shaft of the driving arm and the adapter. It may thus be considered that the force required to introduce the adapter onto the shaft of the arm when mounting the wiper blade is between 10 Nm and 30 Nm.

According to one feature of this wiping system, the driving arm comprises a locking member contributing to securing the driving arm to the connection device, this locking member extending at least partially perpendicular to one of the lateral sidewalls of the driving arm and comprising at least one bent-over edge, and some play is provided, this play being measured between the bent-over edge of the locking member and the first lateral wall of the adapter, such play being non-zero value.

This locking member extends perpendicular to one of the lateral sidewalls of the driving arm, which is to say substantially perpendicular to a longitudinal direction or direction of elongation of the driving arm. The locking member comprises, at one of its ends that lies distant from the driving arm, a bent-over edge. The locking member is intended to cover the connection device, the bent-over edge facing the second lateral wall of the adapter, the latter and the driving arm being positioned side-by-side.

There is a clearance, measured between the bent-over edge of the locking member and the first lateral wall of the adapter that bears the hole equipped with the immobilizing member. According to the invention, this clearance is non-zero value. Such a clearance contributes to preventing pivoting between the adapter and the driving arm.

Further features, details and advantages of the invention will emerge more clearly on reading, on the one hand, the following description, and, on the other hand an exemplary embodiment provided by way of non-limiting example with reference to the attached drawings in which.

In the figures, elements that are common to several figures retain the same references.

In the following detailed description, the terms "longitudinal", "transverse" and "vertical" refer to the orientation of the adapter according to the invention. A longitudinal direction corresponds to a main direction of elongation of this adapter, this longitudinal direction being parallel to a longitudinal axis L of a coordinate system L, V, T illustrated in the figures. A transverse direction corresponds to a direction in which the shaft of the driving arm extends, this transverse direction being parallel to a transverse axis T of the coordinate system L, V, T and this transverse axis T being perpendicular to the longitudinal axis L. Finally, a vertical direction corresponds to a direction parallel to a vertical axis V of the coordinate system L, V, T, this vertical axis V being perpendicular to the longitudinal axis L and to the transverse axis T.

Furthermore, references to "lower" and "upper" with regard to the elements of the adapter mean, relative to the remoteness of these elements from the locking member of the driving arm, an upper end of such elements corresponding to the end positioned in the vicinity of this locking member while a lower end corresponds to the end positioned distant from the locking member.

Figure 1:
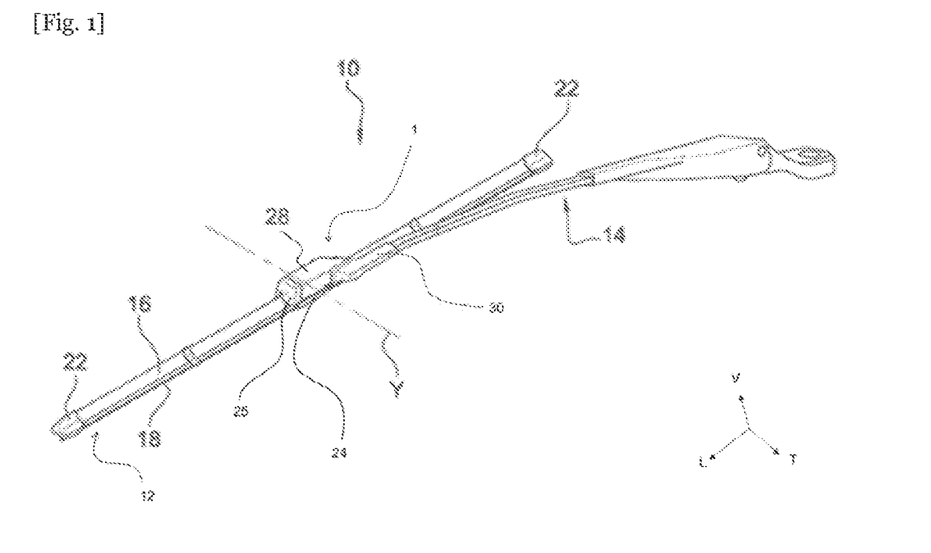
FIG. 1 is a schematic perspective view of a wiping system in which an adapter according to the invention contributes to connecting a wiper blade to a driving arm.

FIG. 1 thus illustrates a wiping system 10 according to the invention, comprising a wiper blade 12 and a driving arm 14 for driving the wiper blade 12. The wiper blade 12 comprises a longitudinal body 16, a wiper blade rubber 18, generally made of rubber, and at least one vertebra (not visible) which stiffens the wiper blade rubber 18 and encourages it to press against a vehicle windscreen.

The schematically depicted wiper blade 12 further comprises end fittings or clips 22 for attaching the wiper blade rubber 18 and the vertebra to the longitudinal body 16, these end fittings 22 being situated at each of the longitudinal ends of the longitudinal body 16.

The wiper blade 12 bears, substantially at its middle, a connection device 1 according to the invention. This connection device 1 notably comprises a connector 24 and an adapter 25 according to the invention.

This adapter 25 contributes to connecting the connector 24 to a driving arm 14. The adapter 25 is mounted on the connector 24 in such a way as to maintain a degree of freedom to pivot about an axis of articulation Y which is a transverse axis substantially perpendicular to the longitudinal axis of the wiper blade 12. This degree of freedom allows the wiper blade 12 to pivot with respect to the driving arm 14 and thus allows the wiper blade 12 to follow the curvature of the windscreen as it moves.

The driving arm 14 is driven by a motor, not depicted, to follow an angular back-and-forth movement that allows water and possibly other undesirable elements with which the windscreen is covered to be removed. The adapter 25 provides the connection between the wiper blade 12 and the driving arm 14. More specifically, these contribute to connecting a head or yoke 28 belonging to the driving arm 14, and which may be formed as one piece with the driving arm 14 or else may be attached and fixed to a rod thereof.

The yoke 28 has an elongate shape in an overall direction substantially parallel to the longitudinal direction of the wiper blade 12. The yoke 28 is extended at one of its longitudinal ends by a connecting part 30 for connecting to the rod of the driving arm 14.

Figure 2:
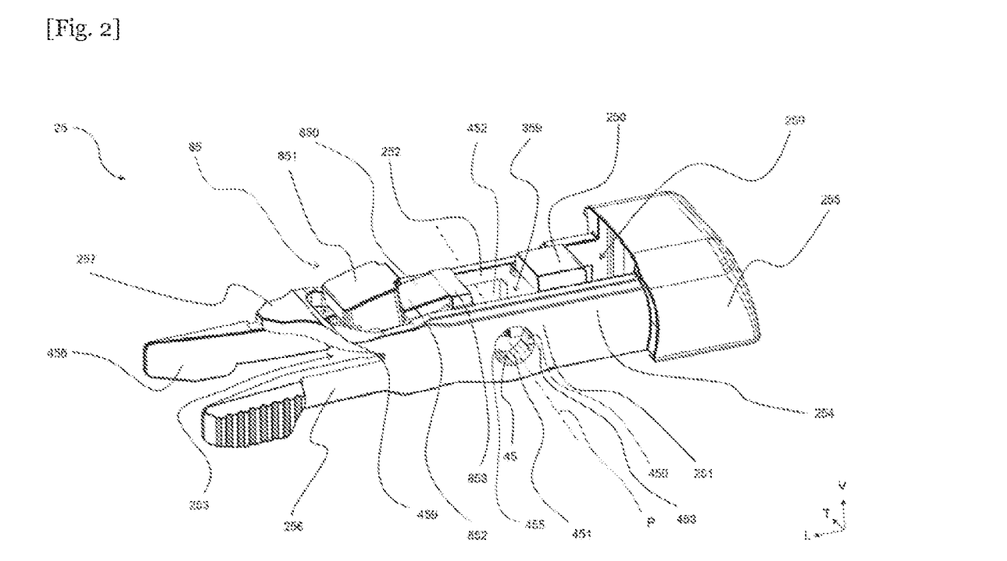
FIG. 2 is a perspective side view of the adapter of FIG. 1.
Figure 3:
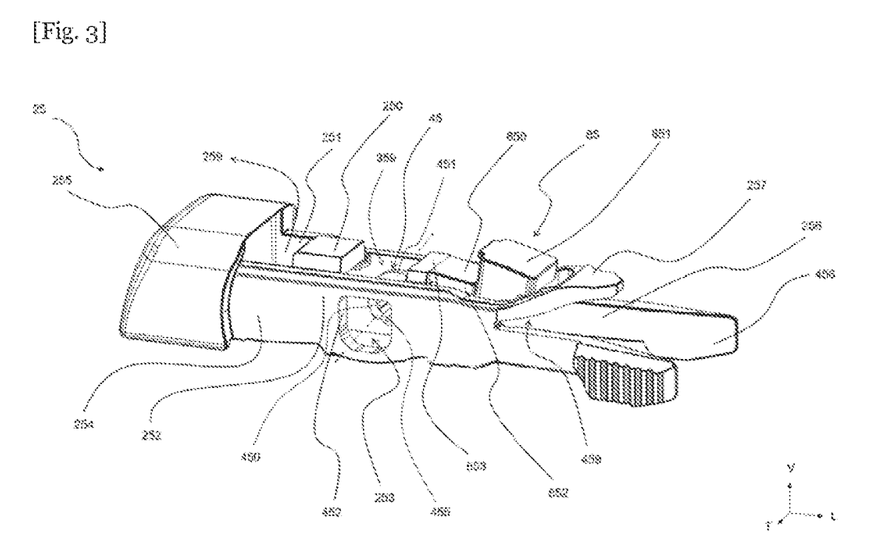
FIG. 3 illustrates the adapter of FIG. 2 viewed in perspective from another side.

FIGS. 2 and 3 are perspective views of the adapter 25 of FIG. 1, in side view from opposite sides. The adapter 25 extends mainly in the longitudinal direction and has a substantially U-shaped transverse cross section. This adapter 25 has a body 254 which comprises a first lateral wall 251 and a second lateral wall 252, these walls being substantially mutually parallel and distant from one another. These walls 251, 252 are connected to one another by an upper wall 250 substantially perpendicular to them. The walls 250, 251, 252 of this adapter 25 have a shape that is elongated in the longitudinal direction, and between them they define an internal housing 253 intended to accommodate the connector 24.

At one of its longitudinal ends, the body 254 of the adapter 25 is connected to a head 255, the vertical and transverse dimensions of which are greater than those of the body 254 of the adapter 25. It will thus be appreciated that the head 255 extends beyond a longitudinal and transverse plane in which the upper wall 250 extends, and beyond a longitudinal and vertical plane in which the lateral walls 251 and 252 extend. The head 255 is notably a locking means. More specifically, when the wiper blade 12 is assembled with the driving arm 14 via the connection device 1 as illustrated in FIG. 1, this head 255 forms an end-stop for the yoke 28 of the driving arm 14, thus preventing translational movement of this yoke beyond the body 254 of the adapter 25.

At another of its longitudinal ends, the upper wall 250 of the adapter 25 narrows to a point 257 which overhangs beyond the body 254. At this other longitudinal end, the body 254 of the adapter 25, and more particularly the lateral walls 251, 252, are each continued in the form of an elastically deformable leg 256. These legs 256 may be brought closer together by elastic deformation. The legs 256 are substantially symmetrical about a plane of symmetry extending in longitudinal and vertical directions and situated equidistantly from the first lateral wall 251 and from the second lateral wall 252. Each leg 256 furthermore has a locking portion 456 configured to collaborate with cutouts in the yoke 28 of a driving arm 14 so as to lock the assembly of the adapter 25 therewith, thus constituting another locking means.

The upper wall 250 is pierced with a first opening 259, a second opening 359 and a third opening 459 which are aligned in the longitudinal direction and open onto the internal housing 253. The third opening 459, which is in the vicinity of the legs 256, is partially covered by a locking member 85. This locking member 85 notably comprises a flexible tongue 850 and a push-button 851. This tongue 850 extends mainly in the longitudinal direction and has a fixed end 853 some distance from the legs 256, which is connected to the lateral wall 251 and to the lateral wall 252 by a bridge of material, and a free end 852, which is able to move, in the vicinity of the legs 256. The tongue 850 is elastically deformable, and its free end 852 bears the push-button 851.

Figure 7:
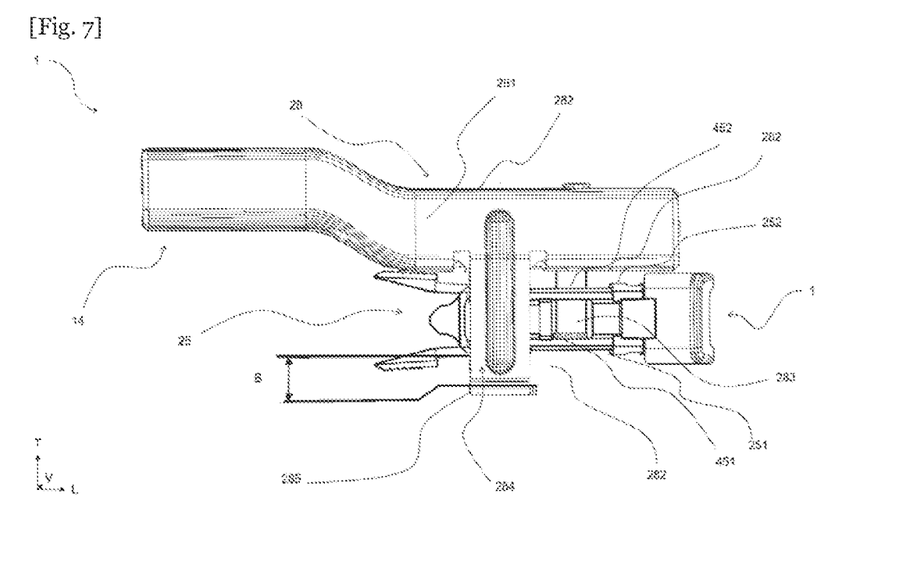
FIG. 7 is a view from above of the connection device of FIG. 6 comprising the adapter according to the invention assembled with a driving arm.

The first lateral wall 251 is equipped with a pivot member 45 intended to allow the adapter 25 to rotate relative to the connector 24. This pivot member 45 comprises a pivot bushing 455. A through-hole 451 of substantially circular shape is formed in the first lateral wall 251, this hole 451 being configured to accept a shaft 283 of the driving arm 14, as depicted in FIGS. 5 and 7.

Figure 6:
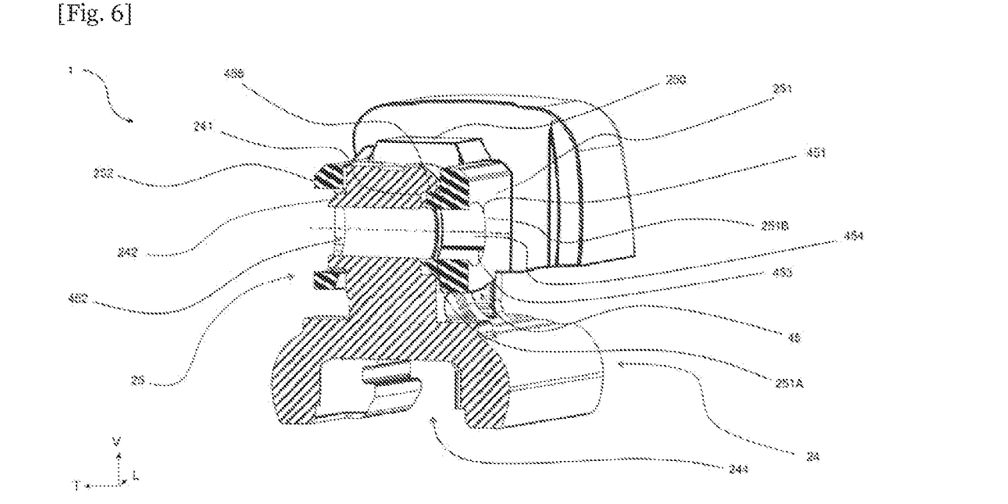
FIG. 6 is a perspective view in cross section of a connection device according to the invention comprising the adapter of FIG. 1 associated with a connector.

On the other hand, the second lateral wall 252 is equipped with a through-orifice 452 of substantially parallel shape which is aligned with the axis of the hole 451. The hole 451 and the orifice 452 open onto the internal housing 253. When the adapter 25 is assembled with the driving arm 14, the shaft 283 of this driving arm 14 passes right through the adapter 25, passing both through the pivot member 45 and more particularly through the hole 451 of the first lateral wall, and through the orifice 452 of the second lateral wall 252. The shaft 283 of the driving arm 14 is in contact with the hole 451 but not with the orifice 452, even though it passes through both this hole 451 and this orifice 452. This hole 451 and this orifice 452 have passing through them an axis of pivoting P of the adapter 25 relative to the connector 24, as depicted in FIG. 6, and, by extension, of the wiper blade 12 connected to the adapter 25 relative to the driving arm 14 connected to the connector 24.

According to the invention, the hole 451 has at least one immobilizing member 450 which may for example adopt the form of a rib 453 able to block pivoting and translational movement between the shaft 283 of the driving arm 14 and the adapter 25.

Figure 4:
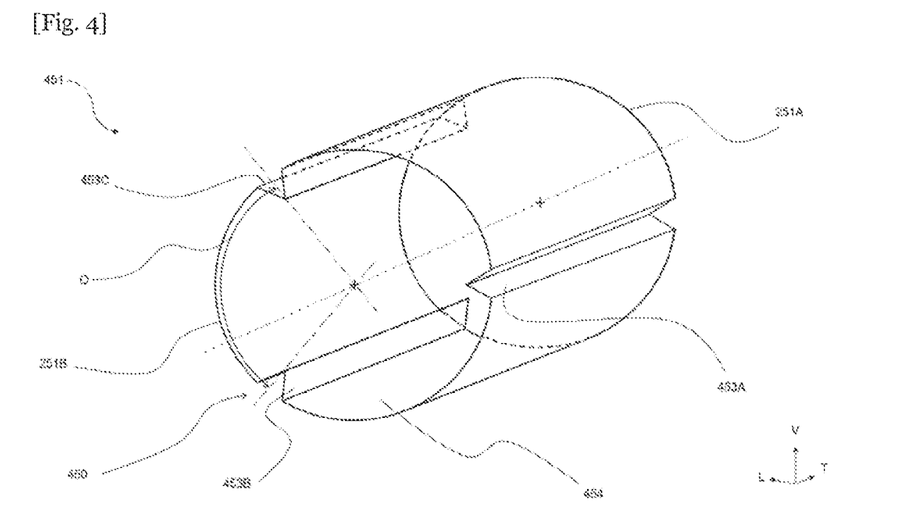
FIG. 4 schematically shows the hole of FIG. 2, this hole being depicted in perspective.
Figure 5:
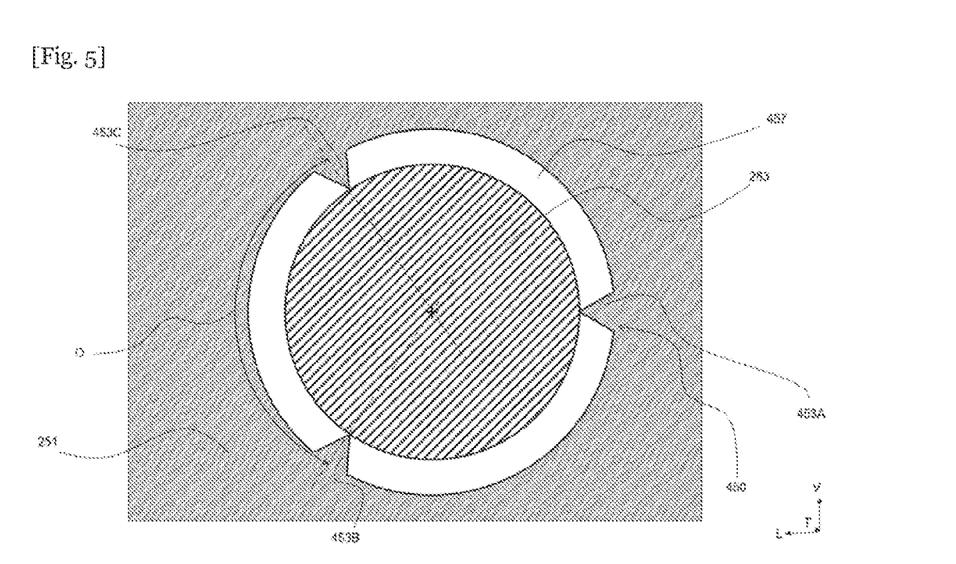
FIG. 5 shows a cross section through the hole of FIG. 2, in this instance accommodating a driving arm shaft.

FIGS. 4 and 5 are schematic depictions of this hole 451. According to the embodiment depicted, the hole 451 has three ribs 453, here referenced 453A, 453B and 453C, which are equally circumferentially distributed and therefore separated from one another by an angular sector of 120°. However, the number and position of the ribs with which the hole 451 is equipped may differ according to the embodiment and may notably be another multiple of two or of three. The first lateral wall 251 which bears the hole 451 is delimited transversely by an internal face 251A and an external face 251B, these faces 251A and 251B also delimiting a surface 454 which delimits the hole 451. It will be appreciated that this surface 454 is formed by the thickness of the first lateral wall 251 of the adapter 25. The hole 451 thus forms a receiving cylinder, advantageously of circular section, formed in the thickness of the first lateral wall 251.

The ribs 453 extend continuously from the internal face 251A as far as the external face 251B of the relevant lateral wall, and therefore run along the entire thickness of the first lateral wall 251. These ribs 453 project from the surface 454 and therefore extend out beyond the same. Such a projection may for example be by 0.05 centimetre, which means that the ribs 453 extend 0.05 centimetre beyond the surface 454. The ribs 453 runs parallel to the axis of the hole 451 configured to accept the shaft 283 of the driving arm 14, as visible in FIG. 4. Because the ribs 453 projects out from the surface 454, when the shaft 283 of the driving arm 14 is inserted into the hole 451, this shaft 283 is not in contact with this surface 454, with the exception of the ribs 453. It will thus be appreciated that, with the exception of the ribs 453 on which the shaft 283 of the driving arm 14 rests, there is a space 457 between the surface 454 and the shaft 283, this space 457 being depicted in FIG. 5.

When the shaft 283 of the driving arm 14 is inserted translationally into the hole 451 of the first lateral wall 251, the ribs 453 become deformed. They constitute a contact surface or anchor point relative to the shaft 283 and thus allow the shaft to be a tight fit in the adapter 25. This anchor point and this tight fit contribute to the creation of bracing, contributing to preventing the pivoting or sliding of the shaft 283 of the driving arm 14 relative to the adapter 25, and respective translational movement thereof so long as the force generated in this translational movement is below 30 Nm, which is higher than the loadings involved when the wiper system is in operation.

FIG. 6 illustrates the connection device 1 according to the invention, this connection device 1 being intended to connect the wiper blade 12 to the driving arm 14. This connection device 1 comprises the adapter 25 which can be connected to the driving arm 14, and the connector 24 which can be secured to the wiper blade 12. This wiper blade 12 is inserted into the housing 244 of the connector 24, this housing 244 being designed to accept it.

The connector 24 and the adapter 25 are fitted one inside the other so as to form a dissociable entity corresponding to the connection device 1. It will thus be appreciated that the elements of the connection device 1 are assembled removably, which is to say that they can be associated and dissociated by turns, without becoming damaged. To this end, the connector 24 comprises, on one of its lateral sides, which faces the first lateral wall 251, a bearing 241 which accepts the pivot member 45 and more particularly the pivot bushing 455. This bearing 241 thus corresponds to a bore in the lateral side of the connector 24. The pivot bushing 455, which projects on the internal face 251A of the first lateral wall 251, is thus driven into the bearing 241 in a male-female assembly.

The connector 24, on an opposite lateral side in a direction transverse to a lateral side that bears the bearing 241, has a ring 242 which likewise contributes to assembling the connector 24 with the adapter 25. This ring 242, which corresponds to a shoulder, projects from the lateral side of the connector 24. The ring 242 is housed in the orifice 452 of the second lateral wall 252 of the adapter 25, likewise in a male-female assembly.

The adapter 25 and the connector 24 may thus pivot by virtue of collaboration between their elements, which is to say by virtue of collaboration of the pivot bushing 455 of the pivot member 45 in the case of the adapter 25, and of the bearing 241 and of the ring 242 in the case of the connector 24. When, in a wiping system 10 according to the invention, the wiper blade 12 is connected to the driving arm 14 via a connection device 1, the adapter 25 is therefore mounted with the ability to pivot with respect to the connector 24. Effectively, the pivot member 45 acts as a pivot connection. Thus, when the connector 24 is secured to a wiper blade 12, for example by crimping, this wiper blade 12 is able to pivot with respect to the adapter 25 and to the driving arm 14 to which this adapter 25 is connected. As a result, the wiper blade 12 can, in its movements, perfectly follow the curved surface of the windscreen of the vehicle to which it is fitted.

Conversely, the pivoting or slippage of the driving arm 14 with respect to the adapter 25 is blocked by the immobilizing member 450, notably at least one rib 453, this rib 453 wedging the shaft 283 of the driving arm 14 in the pivot member 45 and more particularly in the hole 451 in the first lateral wall 251. During operation of the wiping system 10 as illustrated in FIG. 1, a bracing effect occurs, thus preventing the pivoting or slippage as described hereinabove.

FIG. 7 illustrates the connection device 1 comprising the adapter 25 according to the invention, this connection device 1 being assembled with the driving arm 14.

This driving arm 14 comprises a yoke 28 formed in the end part of the driving arm 14. This yoke 28 is notably made up of an upper wall 281 extending in the longitudinal direction of the driving arm 14, this upper wall 281 being flanked by two lateral sidewalls 282 perpendicular to it. In order to assemble the adapter 25 and, more generally, the connection device 1, with the driving arm 14, the latter has a locking member 284. Such a locking member 284 takes the form of a tab which extends perpendicular to one of the lateral sidewalls 282 of the driving arm 14, notably extending in a plane coincident with a plane of extension of the upper wall 281 of the yoke 28. This locking member 284 comprises, at one of the ends of the tab that lies distant from the driving arm 14, a bent-over edge 285. This bent-over edge extends in a plane parallel overall to the plane of extension of at least one of the lateral sidewalls 282 of the yoke 28.

When the connection device 1 comprising the adapter 25 and the connector 24 is being associated with the driving arm 14, this connection device 1 is pivoted through around 45° so that the shaft 283 is transversely and forcibly inserted into the hole 451 in the adapter 25, and it is then aligned in the longitudinal direction by pivoting the wiper blade using the pivot member of the adapter.

The shaft 283 of the driving arm 14 then passes right through the connection device 1 and notably the adapter 25, which is to say passes from the first lateral wall 251 to the second lateral wall 252 thereof, and extends beyond the longitudinal-vertical planes in which these lateral walls 251 and 252 extend. The locking member 284 grips the connection device 1, thus securing it to the wiper blade 12. To achieve that, the bent-over edge 285 comes to face the second lateral wall 252 of the adapter 25, the latter and the driving arm 14 being aligned in the transverse direction.

When the adapter 25 and the driving arm 14 have been thus associated, a first distance measured between the first lateral wall 251 and the second lateral wall 252 is shorter than a second distance measured between the lateral sidewall 282 of the driving arm 14 from which the locking member 284 extends and the turned-over edge 285 of the locking member 284. It will therefore be appreciated that there is a clearance, the clearance B, between the turned-over edge 285 of the locking member 284 and the first lateral wall 251 of the adapter 25 that bears the hole 451. According to the invention, this clearance B is non-zero value. Such a clearance does not affect the mechanical connection between the adapter 25 and the driving arm 14 because it is brought about by the tight fitting of the shaft 283 of the driving arm in the hole 451 bearing the member 450 for immobilization on the adapter 25.

The present invention thus proposes an adapter having at least one rib, wherein this rib causes bracing of a shaft of a driving arm, thus preventing pivoting and translational movement of the driving arm relative to the adapter.

However, the present invention is not limited to the means and configurations described and illustrated herein and it also extends to all equivalent means and configurations and to any technically functional combination of such means.

The invention claimed is:

1. An adapter configured to connect a wiper blade to a driving arm for a vehicle via a connector, the adapter comprising:
    a first lateral wall and a second lateral wall between which an upper wall is positioned, at least one of these lateral walls comprising a pivot member that allows the adapter to rotate with respect to the connector,
    the pivot member comprising at least one hole configured to receive a shaft of the driving arm, wherein the pivot member comprises at least one immobilizing member that projects inward the hole and able to block pivoting between the shaft of the driving arm and the adapter within the hole,
    wherein the shaft is in contact with the at least one immobilizing member,
    wherein the shaft is immobilized in terms of both rotational and translational movement with respect to the adapter by the at least one immobilizing member.

2. The assembly according to claim 1, wherein the immobilizing member comprises at least one rib formed on a surface delimiting the hole.

3. The assembly according to claim 2, wherein the immobilizing member comprises at least three ribs separated from one another by an angular sector of 120°.

4. The assembly according to claim 2, wherein the at least one rib extends parallel to an axis of the hole configured to accept the shaft of the driving arm.

5. The assembly according to claim 1, wherein the lateral wall bearing the hole is delimited by an internal face and an external face, and at least one of the ribs extends continuously from the internal face to the external face of the lateral wall.

6. The assembly according to claim 1, wherein at least one rib projects from a surface delimiting the hole.

7. The assembly according to claim 1, wherein the first lateral wall is provided with the hole configured to accept the shaft of the driving arm, the second lateral wall comprising an orifice aligned on an axis of the hole and which has a cross section of parallelepipedal shape.

8. The assembly according to claim 1, wherein the connector comprises a bearing which accepts the pivot member.

9. The assembly according to claim 1, wherein the connector comprises a ring which projects from a lateral face of the connector, the ring being housed in a orifice of the second lateral wall of the adapter.

10. A wiping system comprising the assembly of claim 1, wherein the adapter being immobilized in terms of rotational and in terms of translational movement with respect to the driving arm by the immobilization member, the adapter being mounted with the ability to pivot with respect to the connector via at least the pivot member.

11. The assembly according to claim 1, wherein the immobilizing member extends out beyond a surface delimiting the hole toward an interior of the hole.

12. An assembly comprising an adapter connecting a wiper blade to a driving arm for a vehicle via a connector, the adapter comprising:
    a first lateral wall and a second lateral wall between which an upper wall is positioned, at least one of these lateral walls comprising a pivot member that allows the adapter to rotate with respect to the connector,
    the pivot member comprising at least one hole configured to receive a shaft of the driving arm, wherein the pivot member comprises at least one immobilizing member able to block pivoting between the shaft of the driving arm and the adapter within the hole,
    the at least one immobilizing member projects inward the hole and comprises at least one rib, or a series of blocks or sectors, and
    wherein the shaft is in contact with the at least one immobilizing member,
    wherein the shaft is immobilized in terms of both rotational and translational movement with respect to the adapter by the at least one immobilizing member.

* * * * *

UNITED STATES PATENT AND TRADEMARK OFFICE
CERTIFICATE OF CORRECTION

PATENT NO. : 12,109,982 B2
APPLICATION NO. : 17/815651
DATED : October 8, 2024
INVENTOR(S) : Stéphane Houssat et al.

Page 1 of 1

It is certified that error appears in the above-identified patent and that said Letters Patent is hereby corrected as shown below:

In the Claims

At Column 9, Claim number 1, Line 10, change "An adapter configured to connect" to ---An assembly comprising an adapter connecting---.

Signed and Sealed this
Twenty-sixth Day of November, 2024

Katherine Kelly Vidal
*Director of the United States Patent and Trademark Office*